Aug. 30, 1955     W. J. HOLLOWAY     2,716,249
METHOD OF MAKING A SHOE COUNTER STRUCTURE
Filed Oct. 22, 1953
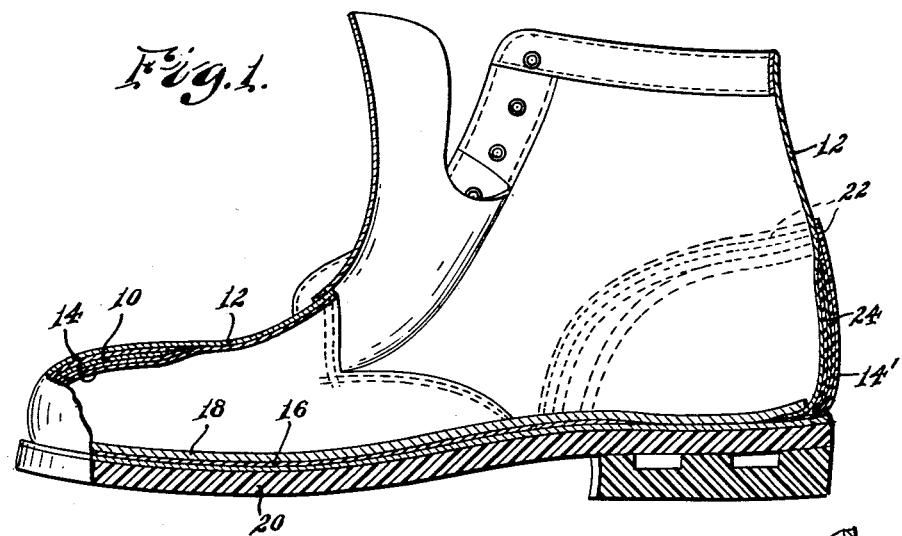
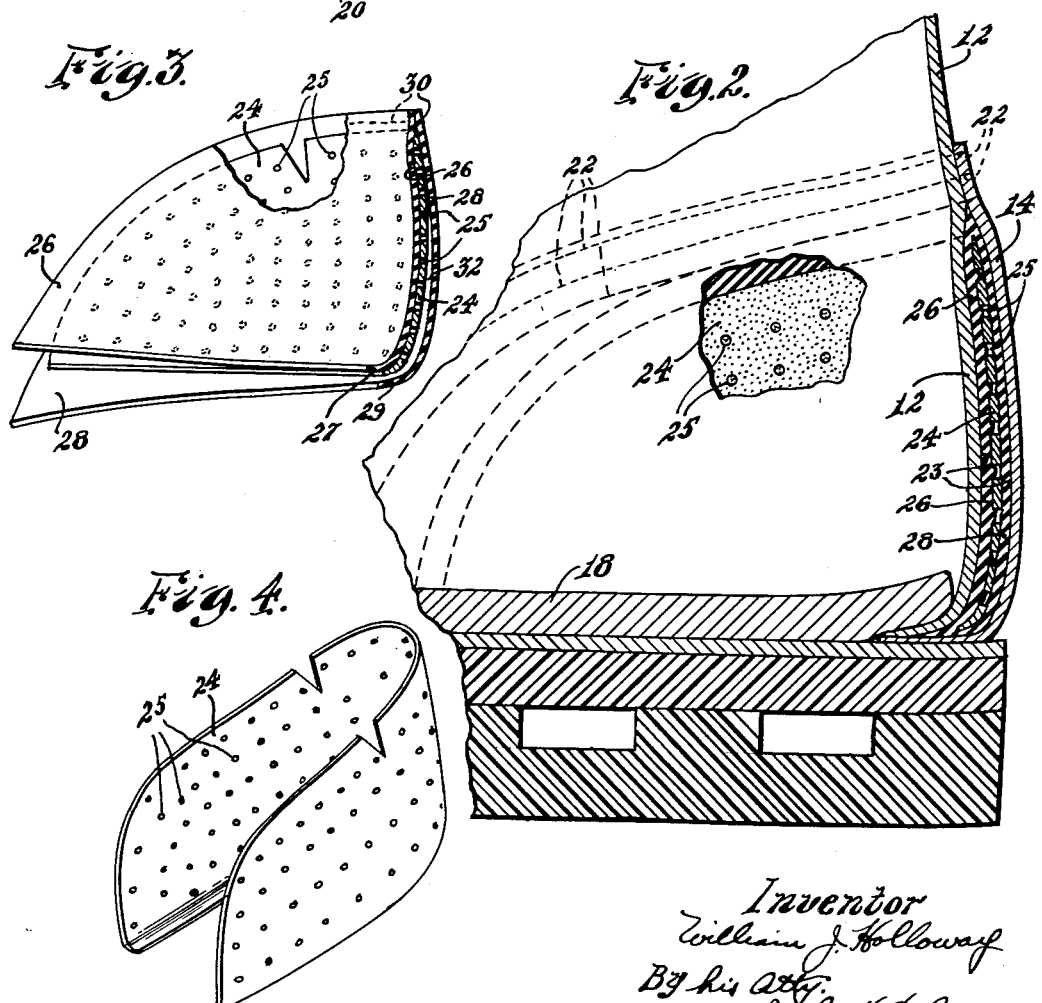
Inventor
William J. Holloway
By his atty.
John H. McKenna United States Patent Office 2,716,249
Patented Aug. 30, 1955

2,716,249
METHOD OF MAKING A SHOE COUNTER STRUCTURE

William J. Holloway, Worcester, Mass.

Application October 22, 1953, Serial No. 387,665

2 Claims. (Cl. 12—146)

This invention relates to improvements in armored type shoes and methods of producing them. More particularly the invention provides an improved armored construction at the counter region of such shoes, and an improved method of producing armored shoes embodying the improved counter construction.

In the manufacture of armored shoes, it has been a problem to satisfactorily embody an armor plate around the counter region of a shoe, including protective continuous extent of the plate at the rear of the shoe, while providing an attractive generally smooth exterior appearance which would not deteriorate in use due to the presence of the armor plate. Conventional counter stiffeners, of fibre and the like, even though made extra thick and relatively heavy, fail to provide a desired degree of protection against injury to rear portions of a foot. Sharp objects striking the rear or counter region of shoes having the prior counter stiffeners of fibre, and the like, can cut through an injure the foot and, when forcibly engaged by a heavy object, may be relatively easily deformed enough to seriously injure the foot.

It is among the objects of my present invention to provide an armored shoe having a counter stiffener and protector which is composite of an armor plate and plastic material which becomes adhered in covering relation to all of the surfaces and edges of the plate, whereby the counter stiffener-protector, in use, is a metal-reinforced plastic counter stiffener which provides the protection characteristic of armor plate but with the surface and edge characteristics of the plastic covering material.

Another object of the invention is to provide an armored shoe counter construction wherein a counter stiffener comprises a perforated armor plate having continuous extent around the rear of the shoe and having a plastic material covering its perforated surfaces and its edges with substantial amounts of the plastic material expressed into the perforations of the plate.

Yet another object resides in a novel method of combining, in a shoe, a perforated armor plate extending protectively around the counter region of the shoe and a plastic protective coacting material which covers the surfaces and edges of the plate. According to the invention, two sheets of plastic material are stitched together to provide a pocket for reception of the perforated armor plate, and the plastic material and the plate in its pocket together are embodied within the conventional counter pocket of the shoe upper, following which the plastic material is softened within the counter pocket and molded and adhered to the plate and to the shoe upper and lining, with portions of the plastic material being expressed into the plate perforations whereby, upon setting of the plastic material, the plate is protectively covered and locked against any appreciable movement relative to the upper and lining at the counter region of the shoe.

It is, moreover, my purpose and object generally to improve armored shoe counter constructions and armored counter manufacturing procedures, and more especially such constructions and procedures employing a combination of metal and plastic for stiffening and strengthening the counter region of a shoe.

In the accompanying drawing:

Fig. 1 is a cross-sectional elevation of an armored shoe embodying features of the invention;

Fig. 2 is a fragmentary cross-sectional view similar to the rear portion of the shoe of Fig. 1, on a larger scale;

Fig. 3 is a cross-sectional view of the pocket formed by the two sheets of plastic material, with a perforated armor plate loosely inserted therein; and Fig. 4 is a perspective view of the perforated armor plate designed to strengthen the counter region of a shoe.

Referring to the drawing, Fig. 1 shows an armored shoe having my improved counter structure embodied therein and also, preferably, having a metal armor plate 10 embodied between the upper and lining materials 12, 14 at the toe of the shoe, and a metal plate 16 having substantial extent between the insole 18 and outsole 20.

The invention has to do with the construction of and method of producing the rear counter portion of the shoe wherein the upper 12 and a sheet element 14', stitched exteriorly to the upper at 22, together provide the conventional pocket 23 for receiving a counter stiffener.

According to the invention, an armored counter stiffener-protector is inserted in the counter pocket 23, it comprising the sheet metal armor plate element 24 shaped to fit within the counter pocket 23 and to extend around the counter region of the shoe. However, before the plate element 24 is inserted in counter pocket 23, it is inserted between two initially relatively flexible sheets 26, 28 which may be fabric sheets impregnated with pyroxylin, or the like, or may be sheets of any other suitable material capable of being rendered more or less moldable when acted upon by a solvent. The sheets 26, 28 are secured together by stitches 30, or otherwise, to provide a separate pocket 32 for nicely enclosing the plate element 24, and for nicely fitting within the conventional counter pocket 23. Preferably, the plate element will be of size and shape such that, when it is within the counter pocket 23, its lower edge will be approximately in the plane of the insole 18, but the plastic sheets 26, 28 extend beyond the lower edge of plate element 24 for extending between the lasted portions 12, 14 of the upper.

The plastic sheets 26, 28 are of a nature to become plastic and more or less moldable in the presence of an activated solvent, and the plasticized material sets to relative hardness when the solvent, or most of it, is eliminated by evaporation, or otherwise.

It is a feature of the invention that the counter plate element 24, preferably perforated as at 25, is loosely inserted in pocket 32 of the preliminarily stitched sheets 26, 28 while the latter sheets are free, or relatively free of any solvent, and the sheets 26, 28 with plate 24 loosely combined therewith are inserted within the conventional counter pocket 23 which is formed between the upper 12 and sheet element 14', after which an activated solvent for the pyroxylin is injected into the counter pocket 23 to render the sheets 26, 28 plastic and moldable within the pocket 23. While in the mentioned plastic condition, the sheets 26, 28 and the plate 24 may be manipulated to get them into proper positions preliminarily to the lasting operation, and the pressure exerted on the plasticized sheets 26, 28 by the tensioned upper 12 and sheet element 14' during the lasting process, squeezes and molds the plastic sheet material into intimate relation to the surfaces and edges of plate 24, and forces material of the sheets 26, 28 into the perforations 25 of the plate and into available spaces within the counter pocket 23. If desired, additional molding and smoothing pressure may be applied exteriorly to the upper at the counter region of the shoe to attain an exteriorly smooth and attractive appearance.

The squeezed and molded material of the initial sheets 26, 28 ultimately sets to a relatively hard condition in intimate adhering relation to the perforated plate 24, and it also effectively adheres to the upper and lining, whereby the counter region of the completed shoe is stiffened and strengthened by a plastic-covered metal plate which strongly resists crushing blows and effectively prevents sharp objects from cutting through the counter and injuring a foot in the shoe.

While I have disclosed a preferred embodiment of the invention, various changes may be made in details within the scope of the appended claims, and it is intended that the patent shall cover, by suitable expression in the appended claims, whatever features of patentable novelty exist in the invention disclosed.

I claim as my invention:

1. The method of strengthening the counter region of a shoe comprising stitching together two sheets of a plasticizable material to provide a pocket between them, inserting in said pocket a perforated metal plate having the general form of a shoe counter, and then inserting the pocketed metal plate within a counter pocket formed between sheet elements of a shoe upper, followed by injecting an activated solvent into the counter pocket to render the plasticizable material of said stitched-together sheets relatively plastic, and lasting the said sheet elements of the upper at the counter region of the shoe with incidental molding of the said plastic material into intimate relation to surfaces and edges of the metal plate and with expression of plastic material into perforations of the plate and into adjacent available spaces within the counter pocket, and allowing the plastic material to set to relative hardness within the counter pocket.

2. The method of strengthening the counter region of a shoe comprising stitching together two sheets which have substantial amounts of pyroxylin therein thereby to provide a pocket between the sheets, inserting in said pocket a perforated metal plate having the general form of a shoe counter, and then inserting the combined metal plate and pyroxylin-containing sheets within a counter pocket formed between sheet elements of a shoe upper, followed by rendering the pyroxylin-containing sheets relatively plastic by injecting into the counter pocket an activating solvent for the pyroxylin, and subsequently lasting the said sheet elements of the upper at the counter region of the shoe with incidental molding of the plasticized sheet material into intimate relation with the surfaces and edges of the metal plate and with expression of the plastic material of the sheets into the perforations of the metal plate and into adjacent available spaces within the counter pocket, and allowing the molded pyroxylin-containing sheets to set to approximate hardness within the counter pocket.

References Cited in the file of this patent

UNITED STATES PATENTS

| | | |
|---|---|---|
| Re. 18,932 | Williams | Sept. 5, 1933 |
| 640,900 | Gordon | Jan. 9, 1900 |
| 1,154,429 | Pittroff | Sept. 21, 1915 |
| 1,659,827 | May | Feb. 21, 1928 |
| 1,952,758 | Josephson | Mar. 27, 1934 |
| 1,954,677 | McMurray et al. | Apr. 10, 1934 |
| 2,244,504 | Ridell | June 3, 1941 |
| 2,467,388 | Kambarian | Apr. 19, 1949 |
| 2,537,891 | Greenan | Jan. 9, 1951 |
| 2,569,764 | Jonas | Oct. 2, 1951 |